March 2, 1965 F. G. FISHER ETAL 3,171,660
DUST GUARD
Filed Feb. 13, 1961 3 Sheets-Sheet 1

INVENTORS
Franklin G. Fisher
John J. Weller
BY
ATTORNEYS

March 2, 1965  F. G. FISHER ETAL  3,171,660
DUST GUARD
Filed Feb. 13, 1961  3 Sheets-Sheet 2
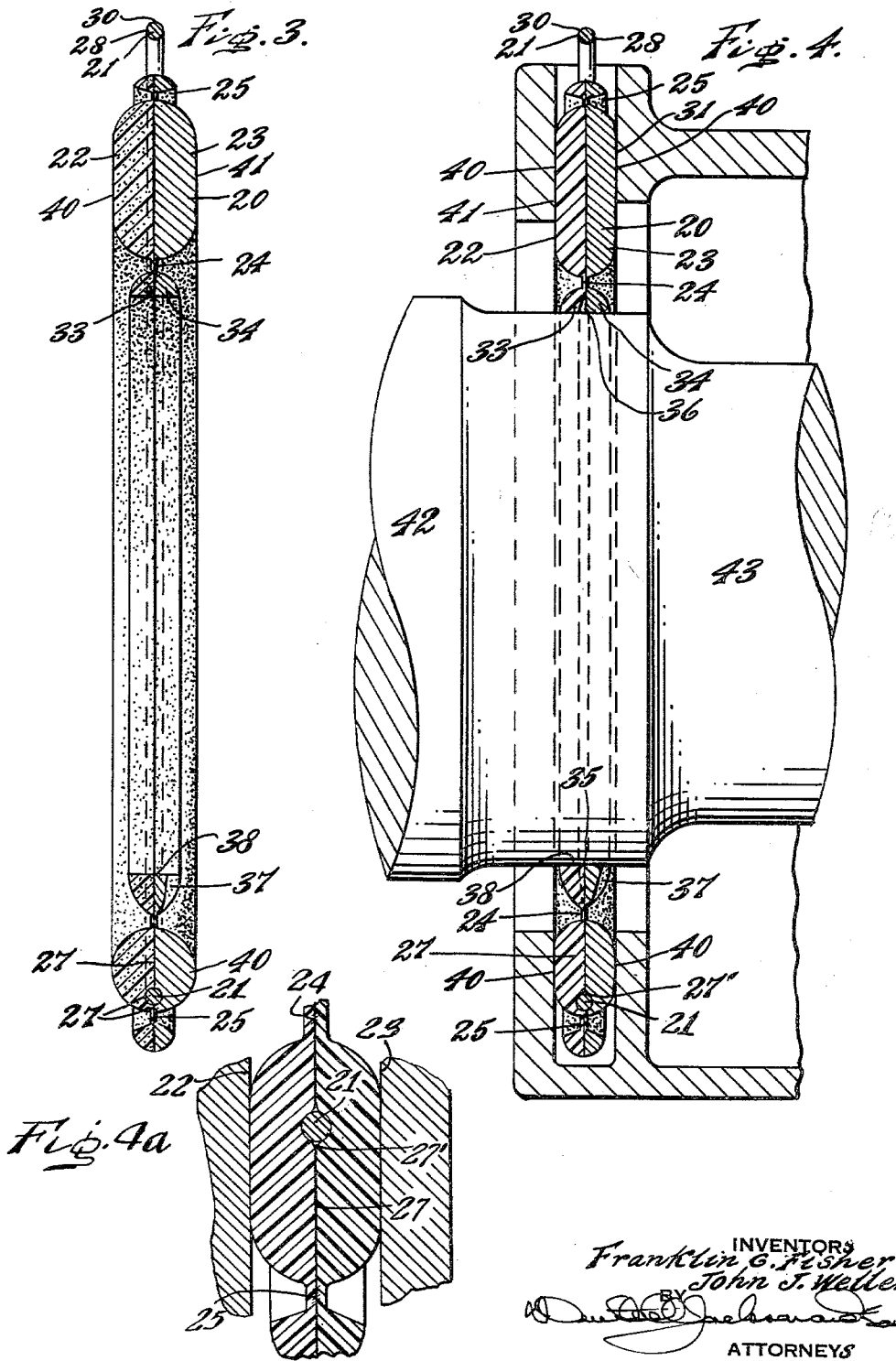
INVENTORS
Franklin G. Fisher
John J. Weller
BY
ATTORNEYS March 2, 1965  F. G. FISHER ETAL  3,171,660
DUST GUARD Filed Feb. 13, 1961  3 Sheets-Sheet 3

INVENTORS
Franklin G. Fisher
John J. Weller
BY
ATTORNEYS

United States Patent Office 3,171,660
Patented Mar. 2, 1965

3,171,660
DUST GUARD
Franklin G. Fisher, Wyomissing, and John J. Weller, Allentown, Pa., assignors to Reading Company, Philadelphia, Pa., a corporation of Pennsylvania, and Standard Plastics, Inc., Fogelsville, Pa., a corporation of Pennsylvania
Filed Feb. 13, 1961, Ser. No. 88,865
1 Claim. (Cl. 277—130)

The present invention relates to dust guards, particularly of the character which are suited for use to replace the American Railway Association dust guard for the Standard antifriction bearing journal box commonly employed on freight cars, passenger cars and other railway cars.

A purpose of the invention is to produce a dust guard which is more resistant to the severity of service conditions, and therefore will have a life expectancy of the order of the service life of the car wheel.

A further purpose is to produce a dust guard which is freely resilient, and therefore can be subjected to impact, but will nevertheless properly retain its place in the dust guard groove of the journal box.

A further purpose is to more effectively seal the journal around the axle to exclude dirt, and maintain the sealing relationship notwithstanding the axial shift of the axle as the car traverses curves and frogs.

A further purpose is to maintain a dust guard in resilient tight sealing relation around the axle notwithstanding the vertical or horizontal movement of the axle incident to normal road or car impact conditions.

A further purpose is to more effectively resist the abrasion and wear which take place at the sealing lip where contact of the dust guard with the axle occurs.

A further purpose is to permit travel of the sealing lip with the axle for limited distance without distorting the dust guard so that it can no longer maintain its position in the dust guard groove, and without actually having the dust guard enter the journal box.

A further purpose is to provide a reinforcement which will resist obpectionable deflection of the dust guard and at the same time prevent wrinkling or piling up of the elastomeric material against the reinforcement due to the motion of the sealing lip. This is preferably accomplished by placing the reinforcement in a pocket between opposed portions of the elastomeric body of the dust guard, said pocket being defined at its inner and outer ends by densified welds of the elastomeric material.

A further purpose is to provide a dust guard body which in the occasional cases in which it may actually enter the journal box will not damage the journal.

A further purpose is to secure wicking action by the sealing lips of a dust guard so as to maintain lubricant in the form of a film between the sealing lips of the dust guard and the axle.

A further purpose is to obtain a defined lubricant channel between sealing lips of a dust guard which will allow oil to flow around the axle and then return and drain back into the journal through a suitable leakage opening at the bottom of one of the lips.

A further purpose is to minimize oil flow through the dust guard by producing a skin of closed pores on the lateral surfaces, while the edge which engages the axle and the interior have open pores.

A further purpose is to provide at the interior edges of the lips a raw edge which is free from skin and therefore will be most effective as an oil film-retaining interface against the axle.

A further purpose is to provide a dust guard which will resist oil at a wide variety of temperatures, suitably in the range between —40 or —50 and +300—or +390° F.

A further purpose is to provide a dust guard which does not become hard or brittle at low temperatures.

A further purpose is to provide a dust guard which will not become soft or flow under elevated temperatures.

A further purpose is to produce a dust guard which is resistant to water and is not corrosively attacked or otherwise affected by prolonged exposure to moisture, or by the presence of ice.

A further purpose is to produce a dust guard which is more resistant to chemicals which it may encounter, such as those dripping from the car, such as brine, acids and alkalis, and also those which are present in dust, such as alkalis.

A further purpose is to produce the dust guard body from an elastomer, preferably polymeric polyester polyurethane, in the form of a foam, preferably having a cell size in the range between 50 and 90 pores per inch, and resistant to oil for a time of at least three hours at any temperature in the range between —40 or —50 and +300 or +390° F. This material is capable of welding together under pressure at elevated temperatures, and is capable of forming a densified fused skin at the lateral surfaces under molding pressure at elevated temperatures.

A further purpose is to minimize leakage of oil from the back end of the journal box in dumping a car.

A further purpose is to provide a dust guard which can be salvaged in case of damage to the car or can be cleaned and reused.

Further purposes appear in the specification and in the claims.

In the drawings we have chosen to illustrate one only of the numerous embodiments in which the invention may appear, selecting the forms shown from the standpoints of convenience in illustration, satisfactory operation and clear demonstration of the principles involved.

FIGURE 3 is a section on the line 3—3 of FIGURE 1.

FIGURE 4 is an axial vertical section through a journal box and axle of a railway car using the dust guard of the invention.

FIGURE 4a is an enlarged fragmentary section similar to FIGURE 4 showing the rigid reinforcement moved to a different position within the pocket from that shown in FIGURE 4.

Figure 1:
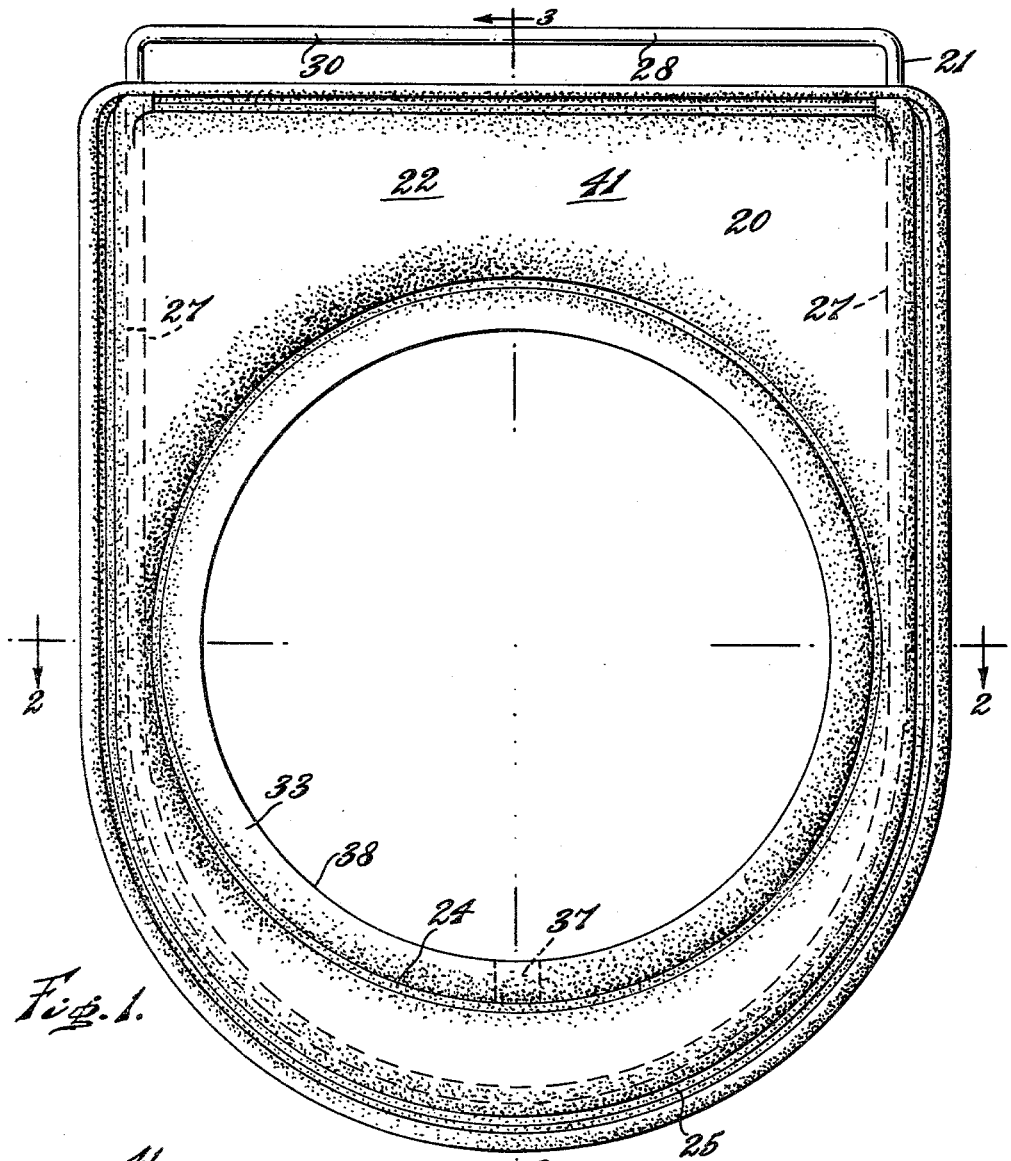
FIGURE 1 is a side elevation of a dust guard of the invention.

In the prior art the conventional dust guard has been made of wood. These dust guards have been relatively unsatisfactory, due to their tendency to disintegrate under impact, disintegrate under extremes of temperature, and the inability to provide and maintain any very close fit to the axle because of the nature of the material.

Efforts were made to employ substitute materials, and metals were used, but proved unsatisfactory because of their tendency to damage the axle or the journal, and because of their limited ability to maintain an effective seal.

Attempts have been made with relatively limited success to make dust guards of rubber. Difficulties encountered include the poor oil resistance of the material, the poor behavior at extremes of temperature, the low resistance to abrasion and wear, and the fact that such dust guards were very likely to distort and lose their proper relation to the dust guard groove of the journal box.

The present invention is designed to produce a dust guard which will give improved service, and has a life expectancy which in may cases is as long as the car wheel itself.

The dust guard of the invention is extremely resistant to exposure to oil at high and low temperatures, and will remain effective under oil exposure for times as long as three hours at temperatures as low as $-40$ or even $-50°$ F. and at temperatures as high as $+300$ or even $+390°$ F.

The dust guard of the invention is also not harmfully affected by water, even after relatively long exposure.

The present invention provides a dust guard which is extremely resistant to exposure to water and moisture generally. It will be evident that under conditions of flooding, and extremely inclement weather operation, and also due to the pumping action in high humidity areas under change of temperature, moisture in considerable quantities may enter the journal box, and also moisture freqeuntly is encountered by the dust guard at the outside of the journal box. The previous dust guard materials were in many cases very poorly resistant to water, and were also likely to be damaged by the presence of ice. The material of the dust guard of the present invention is quite resistant to water and can tolerate long exposure to moisture in various forms including ice.

Under conditions encountered in the operation of freight cars particularly, and in some cases from passenger cars, chemicals may come in contact with the dust guard. Thus for example brine may leak from refrigeration systems, and acids or alkalis may drip from the car lading. Also in certain areas of the country dust which is active chemically, particularly alkali dust, is likely to come into contact with the dust guard. The dust guard of the present invention unlike many of the materials used in the past, is very resistant to chemicals generally including brine, acids and alkalis.

One of the problems in prior art dust guards is that they could not be closely fitted to the axle in order to give an initial seal, or they could not maintain close fit during the operation of the car because of the vertical and horizontal motion of the axle. The dust guard of the present invention gives a tight fit initially so that dirt does not have a chance to enter the journal box, and maintains this tightness of fit notwithstanding extended use. Furthermore the dust guard of the invention tends to prevent escape of oil around the axle, and in fact, due to its wicking action, maintains an oil film or interface between the sealing lips of the dust guard and the axle itself. This is very effective therefore to reduce abrasion of both the axle and the dust guard, and secure long wearing characteristics.

One desirable feature of the dust guard of the invention is that the sealing lips have interposed between them a channel by which oil can flow around the axle, and still return to the journal box by a suitable drain opening at the bottom. There is a centrifugal pumping action due to the rotation of the journal, and this tends to flush the edges of the sealing lips.

In the case of cars which are dumped, as for unloading coal, grain, and other bulk materials, an important problem in the past has been that many of the dust guards permitted escape of oil from the back end of the journal box. One of the great advantages of the dust guard of the invention is that it laterally seals in the dust guard groove and is effective both at the axle and at the dust guard groove or well to prevent leakage of oil in dumping.

In some prior art dust guards, difficulty has been encountered through the tendency to deflect and pull the dust guard out of the dust guard groove or well, so that the dust guard in some cases has actually entered the journal box. In the dust guard of the present invention a reinforcement prevents the elastomeric material from being pulled into the box as the axle moves axially. Furthermore the elastomeric material employed in the present case is of such a character that it is not harmful to the journal box if it does enter the journal box.

Although the reinforcing element is relatively rigid and extends through the interior of the elastomeric body, it is not of a character which prevents the elastomeric material from normal flow under deflection and does not permit wrinkling or piling up against the reinforcing element. This is made possible by providing two portions or halves of the elastomeric body, with a pocket between them in which the reinforcing element is placed. The pocket is defined at the inner and outer edge by pressure welds of the elastomeric material.

The material employed in the making of the body of the dust guard of the invention has the property of wicking to permit maintaining an oil film at the sealing edges, so as to permit self-lubrication as already explained. It is possible, however, and very desirable on the lateral faces of the dust guard to limit the transverse flow of oil through the dust guard by providing a compressed skin, which is relatively resistant to oil flow. The skin, however, desirably does not extend to the sealing edges which are in contact with the axle.

While in the broadest aspects of the invention various elastomers may be used having properties as desired, the preferred embodiment constitutes an elastomeric foam, which in the preferred embodiment has a cell size of 50 to 90 pores per inch. The foam interior and the edge at the axle have open cells. This foam is of a character of a resilient cushion throughout the temperature range of $-40$ or even $-50°$ F. to $+300$ or even $+390°$ F.

The foam is resistant to oil for a duration of at least three hours at any temperature within these ranges. The foam is also resistant to water indefinitely and resistant to chemicals as above set forth for long periods of time.

A very desirable embodiment of the foam is polymeric polyester polyurethane foam. This material, available on the market, is a condensation product of a polyester with polyurethane. Any one of a wide variety of polyesters produced by reaction of a polybasic acid and a polyhydric alcohol may be employed, a suitable example being the condensation product of diethylene glycol and adipic acid. A typical molecular weight for a suitable polyester is of the order of 2000.

The polyester is copolymerized with diisocyanate, a suitable proportion for example being 100 parts by weight of polyester to 8 to 9 parts by weight of the diisocyanate which reacts for chain extension (not including diisocyanate to react with water as well known in the art).

In other cases as little as 3 parts by weight of diisocyanate for chain extension are reacted with 100 parts per weight of polyester.

The polymeric polyester polyurethane foam has the very desirable property of welding with itself or making fusion welds under pressure and elevated temperature as later explained.

The polymeric polyester polyurethane foam also has the property under pressure and elevated temperature of forming an autogenous densified fused skin on the lateral surfaces adjoining the mold which is relatively impervious to flow of oil.

Figure 2:
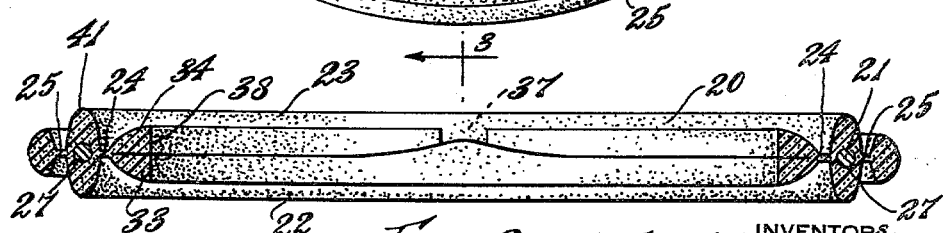
FIGURE 2 is a section on the line 2—2 of FIGURE 1.

The dust guard of the invention as shown in FIGURES 1 to 3 inclusive suitably consists of an elastomeric body 20 of the character described, and a relatively rigid reinforcement 21. The body is desirably composed of opposed parts or halves 22 and 23 which are joined together by an annular weld 24 of densified material inside the reinforcement 21 and by a generally surrounding weld 25 outside the reinforcement 21. The reinforcement is suitably of wire joined together at the ends at 26 and is interposed in a pocket 27 which is between the two halves of the elastomeric body and relatively between the inner and outer welds as above described. The pocket 27 is free to enlarge toward the welds 24 and 25 by the body halves separating at 27', but cannot extend beyond the welds 24 and 25. The opening of the pocket at 27' tends to prevent piling up of elastomer against the reinforcement as the axle moves. This movement is illustrated in FIGURES 4 and 4a, where the wire reinforcement 21 is shown in one position within the pocket 27 in FIGURE 4, and in a different position within the pocket 27 in FIGURE 4a.

The reinforcement desirably extends out above the body proper at 28 to form a handle portion 30 which can conveniently be used to insert the dust guard in the dust guard groove or well 31 as shown, or remove the dust guard.

Inside the inner weld each of the dust guard halves has a lip 33 or 34 whose free diameter before installation is about ⅜ of an inch smaller than the diameter of the axle at 35 where it engages the dust guard, and these lips form between them an annular channel 36 which extends out radially as far as the inner weld 24. This channel 36 as already explained is adapted to carry oil by a centrifugal pumping action as the axle turns. At the bottom on the side toward the journal box a drainage channel 37 is provided, which allows oil pumped around this annular channel 36 to drain back into the journal box.

The inner lip edge 38 is of open cells free from the compressed impervious skin later described, which permits effective wick action to maintain an oil film or interface which continuously provides self-lubrication between the dust guard and the axle at 35.

The lateral faces of the dust guard at 40 which engage and seal against the sides of the dust guard groove or well are of relatively impervious or closed cell skin material 41 which does not readily permit oil flow, so that loss of oil by flow tranversely through the dust guard is thereby minimized. It will also be evident that the welds 24 and 25 are of extremely densified material which has closed cells and is relatively impervious to oil, so that there will be little or no tendency of oil to flow radially from the sealing lips 33 and 34 through the inner weld 24 or to flow from the dust guard radially outwardly through the outer weld 25. Thus the welds perform a seal-off function as far as oil flow in any direction is concerned.

It will be evident that the normal thickness of the dust guard when free from the well or groove 31 is considerably in excess of the width of the well, so that the elastomeric material of the dust guard is compressed when the dust guard is in the well and it tends to maintain its place due to its compression and to laterally seal against the sides of the well 31 and also seal at the lateral outer edges against the outer edge of the well. In a typical example where the width of the dust guard well 31 is of the order of ¾ of an inch, the free thickness of the dust guard material before being placed in the well will be of the order of ⅞ of an inch to 1 inch.

It will be evident that as the axle moves either vertically or laterally in a horizontal plane, the halves of the elastomeric body of the dust guard permit the lips 33 and 34 to travel in sealing contact with the axle, while a radial bulging and flexing action takes place in the elastomeric halves, which will elastically restore their previous position when the axle returns.

This makes the dust guard extremely resistant against fatigue failure, and also greatly reduces the likelihood that stress concentration could cause localized failure in parts of the cellular wall.

It will be evident that the open cell sealing lip of the dust guard performs a wiping action to prevent dirt from entering the journal box, and this action is improved by the presence of the oil film on the inside of the sealing lip.

The axle is of well known character being enlarged at 42 and reduced at 43 on opposite sides of the dust guard. The journal box 44 is of well known construction.

Figure 5:
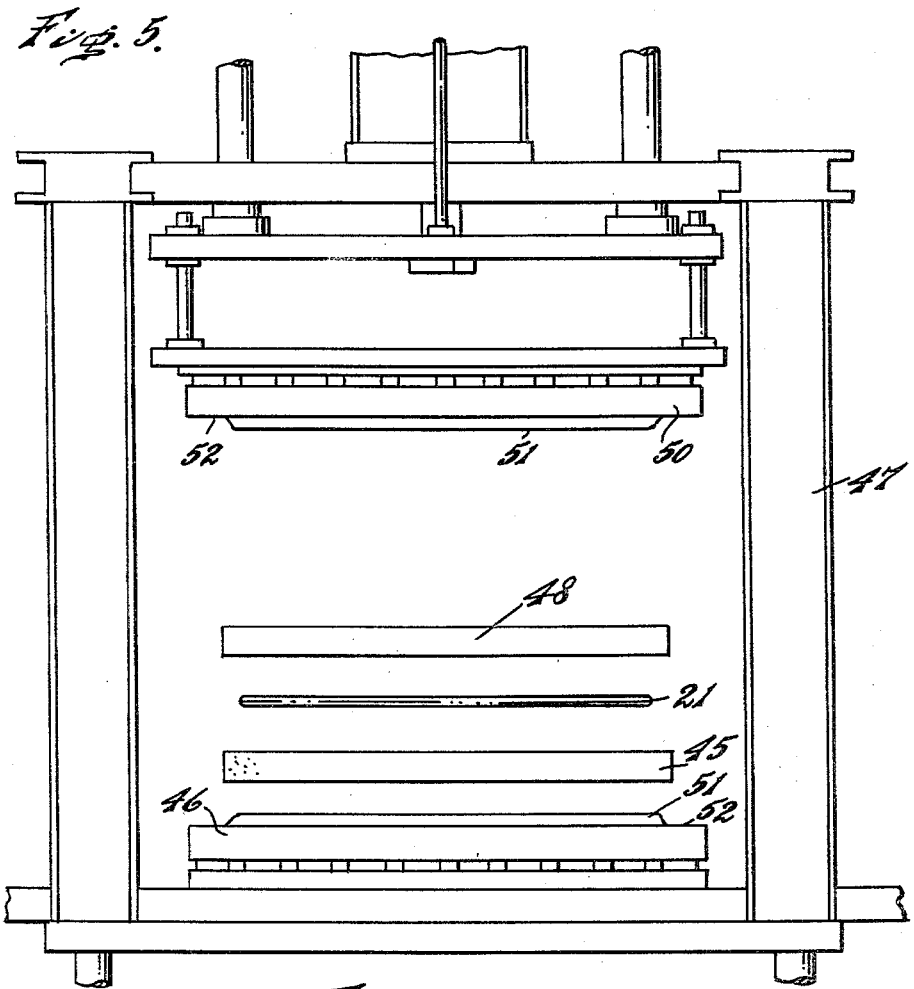
FIGURE 5 is a diagrammatic vertical section partially exploded for reason of explanation, of a molding press for molding the dust guard of the invention.
Figure 6:
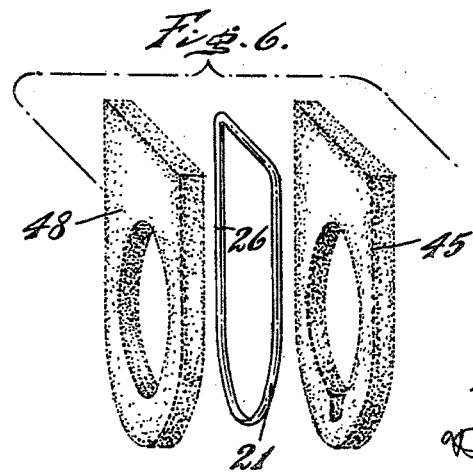
FIGURE 6 is an exploded perspective of the component ends from which the dust guard of the invention is molded.

In one simple way of producing the dust guard of the invention, as shown in FIGURES 5 and 6, a bottom dust guard blank in die cut slab form 45 is placed on bottom mold 46 of press 47, and a suitable loop of reinforcing element 26 is placed on the bottom elastomer half 45. A top elastomer half 48 of die cut slab elastomeric material is placed on top of the reinforcing element and top die 50 is brought into contact with the work. The die contour provides forwardly directed areas 51 at points where the welds are to be made, and provides recesses 52 where less severe compression is to occur, which are to produce the bulged areas of the body. The dies at the welds come together to a point which approximately produces the final weld thickness, except for slight spring back, the compression ratio at the welds being preferably of the order of about 30 to 1 while the ratio of compression in the areas that are subsequently to be bulged is preferably of the order of 2 to 1.

The sides of the mold both at the inside and desirably also at the outside are open, so that there is no tendency to form a skin on the inner sealing edges or the outer edges.

In the weld areas during the molding, an intimate association occurs at both of the interfaces between the two elastometric halves 45 and 48 and also of the cell walls, so that the foam material will be integrated together and remain of high density.

The temperature and time relation will depend upon the material used, but it will preferably in the case of the preferred example of polymeric polyester polyurethane foam above referred to involve a temperature time relation of 300° F. for a time of the order of 3 minutes, or 450° F. for a time of the order of 1½ minutes.

The pressure used over a mold area of 6.82 square inches of weld and 57.7 square inches of bulge material will in a preferred example be approximately 2500 pounds.

The usual precautions to permit parting of the molds from the dust guard will be provided, a suitable example being a polytetrafluoroethylene coating on the mold surfaces.

Once the molding is complete, the molds are separated and the dust guard is removed from the mold and cooled, and is then ready for installation.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claim.

Having thus described our invention what we claim as new and desire to secure by Letters Patent is:

In a dust guard for a railway journal box adapted to be used in the dust guard well of a railway car journal box around an axle, a dust guard body of oil resistant elastomer foam, said dust guard body being composed of two opposed portions, said body having an annular opening forming edges which are adapted to receive and remain in wiping engagement with said axle, forming sealing lips of elastomer foam around the edge of said opening, there being two said sealing lips, one on each portion of the body, with a space between adapted to form a lubricant channel around the inner edge of the opening between said lips, and a stiff reinforcing element extending through the interior of said body and surrounding the said annular opening, adapted to maintain the position of the dust guard in the well at all times, said body portion being joined together both radially inside and outside of said reinforcing element and free from interconnection in the intermediate vicinity of said reinforcing element, leaving said reinforcing element free to permit flow under deflection of the dust guard without piling up of material against the reinforcing element, said body portions being welded together in zones on opposite sides of said reinforcing element.

References Cited in the file of this patent
UNITED STATES PATENTS

| | | |
|---|---|---|
| 2,377,387 | Stromeier | June 5, 1945 |
| 2,758,853 | Beck | Aug. 14, 1956 |
| 2,798,746 | Hoyer | July 9, 1957 |
| 2,989,325 | Lukens | June 20, 1961 |
| 3,022,097 | Seniff et al. | Feb. 20, 1962 |